United States Patent [19]
Patterson et al.

[11] Patent Number: 5,084,237
[45] Date of Patent: Jan. 28, 1992

[54] SIDE INSERTABLE SPACER

[75] Inventors: John F. Patterson, Richland; Richard H. Ewing, West Richland, both of Wash.

[73] Assignee: Advanced Nuclear Fuels Corporation, Richland, Wash.

[21] Appl. No.: 402,093

[22] Filed: Sep. 1, 1989

[51] Int. Cl.$^5$ .............................................. G21C 3/34
[52] U.S. Cl. ..................................... 376/442; 376/439; 376/443
[58] Field of Search ..................... 376/439, 442, 443

[56] References Cited

U.S. PATENT DOCUMENTS

| | | | |
|---|---|---|---|
| 3,928,126 | 12/1975 | Seim et al. | 376/442 |
| 4,651,403 | 3/1987 | DeMario | 29/450 |
| 4,726,926 | 2/1988 | Patterson | 376/439 |

FOREIGN PATENT DOCUMENTS

| | | |
|---|---|---|
| 0164510 | 5/1984 | European Pat. Off. |
| 2517868 | 2/1972 | France |
| 2093945 | 6/1983 | France |

Primary Examiner—Donald P. Walsh
Attorney, Agent, or Firm—Ira Lee Zebrak; Jeffrey P. Morris

[57] ABSTRACT

A grid spacer for a nuclear reactor fuel assembly is formed of two superposed combs. Each comb has a base strip which extends the width of the assembly. To it are attached parallel grid strips which are free at their other ends. The grid strips are perpendicular to the base strip and are formed for spring engagement with the fuel rods of the assembly. The combs can be inserted from the sides of the assembly, so that an additional or substitute spacer can be added to the assembly without disassembling the latter.

11 Claims, 3 Drawing Sheets

SIDE INSERTABLE SPACER

INTRODUCTION

This invention relates to a side insertable spacer designed to permit rapid repair of irradiated fuel assemblies. Fuel assemblies for nuclear reactors are formed of a large number of long, parallel fuel rods. At each end of the assembly, there is a tie plate to which, in some designs, the fuel rods are attached. In other designs the fuel rods terminate short of the tie plates and the tie plates are connected to tie rods so as to form the framework for the assembly. Intermediate the tie plates there are a number of grid spacers formed of "egg crate" strips which serve to space the fuel rods and restrain them from vibration. At times there may be fretting of fuel rods at or adjacent to the tie plates so that it is desirable to insert additional grid spacers. In other cases, the grid spacers may be damaged in handling so that the replacement becomes necessary. In previous designs, it has been necessary to essentially disassemble the fuel bundle if new spacers are to be inserted. This is, of course, a difficult procedure, particularly since it will ordinarily be carried out on assemblies which have been irradiated in the nuclear reactor and have therefore become radioactive.

BRIEF DESCRIPTION OF THE INVENTION

Our invention provides a spacer which can be inserted into a finished fuel assembly without disassembling the latter. It is formed of two superposed "combs." Each comb includes an end strip corresponding in length to one side of the fuel assembly. Perpendicular to this end strip are a plurality of grid strips which engage the fuel rod. The grid strips are so constructed as to have spring members which press against the fuel rods. When the spacer is completely assembled, the superposed combs will extend at right angles or some other angle, depending on the shape of the assembly, to each other. Together they form a complete grid spacer which will hold the rods in position. The combs are of such structure that they can be remotely inserted into the assembly even under water by the use of long-handled tools.

DETAILED DESCRIPTION

Figure 1:
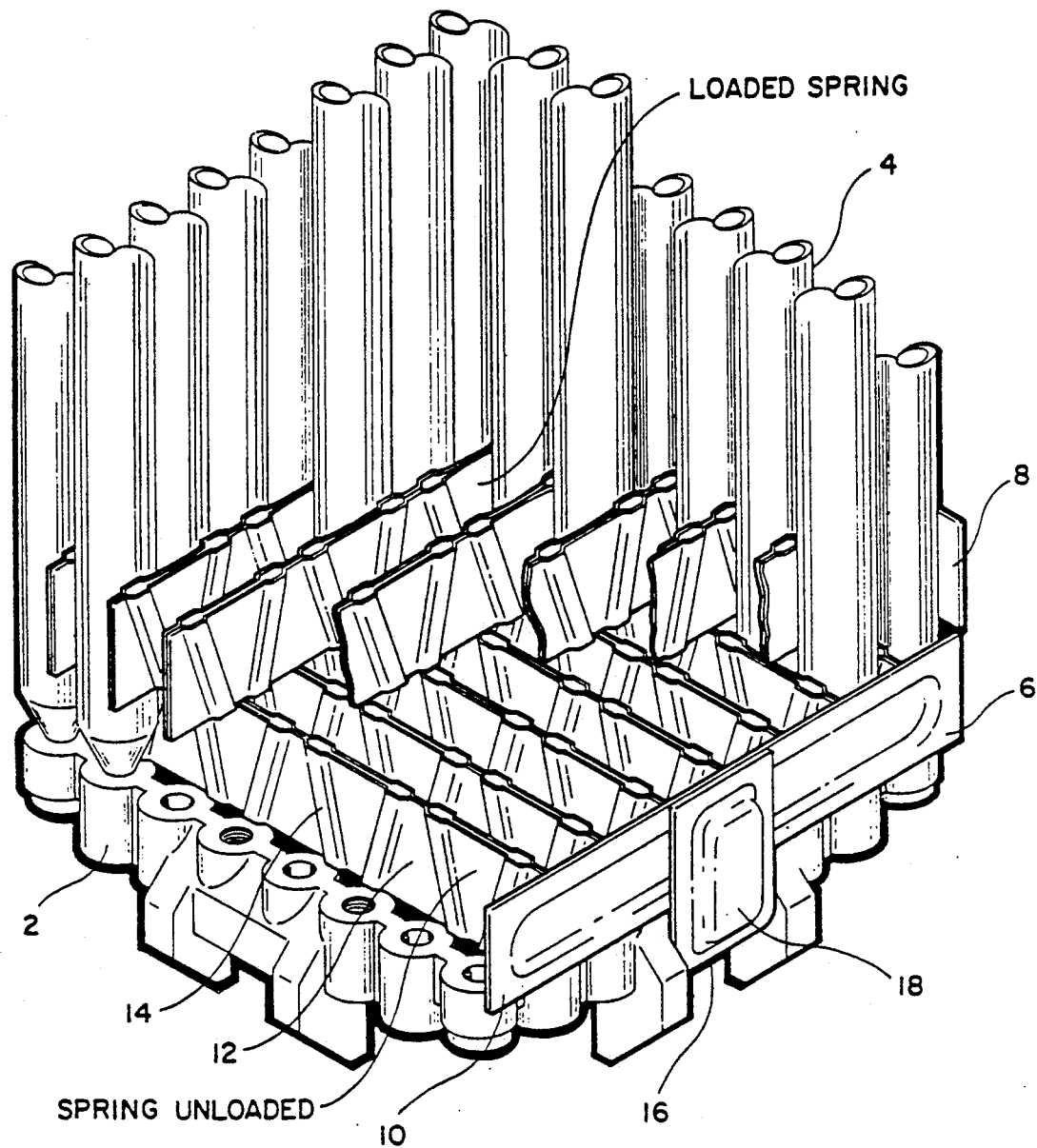
FIG. 1 is a perspective view with parts broken away, showing our grid spacer applied to a boiling water reactor assembly.

Referring to FIG. 1, the assembly includes a bottom tie plate 2 and fuel rods 4. As will be understood, fuel rods actually occupy the entire area of the tie plate; for convenience, only a few are shown. Our spacer includes a lower comb 6 and an upper comb 8. The two combs are essentially identical so the description will be made in connection with the lower comb. The comb includes a single end strip 10 which corresponds in length to the width of the assembly. This in turn is determined by the width of the tie plate 2. Extending at right angles to the end strip 10 are a plurality of grid strips 12. In the particular embodiment shown, these grid strips are made double and of spring material. They are also provided with inclined channels 14 for directing streams of cooling water in such a manner as to produce swirling about the fuel rods. These inclined channels engage the fuel rods and when they do so, the spring strips are pressed together thereby exerting a spring action on the fuel rods. The condition of the strips in the unloaded and loaded positions are indicated by the respective legends. The ends of strips 12 remote from strip 10 are free.

As is well known, fuel assemblies for boiling water reactors are enclosed by a flow channel. We provide a bracket 16 having a protrusion 18 which engages this flow channel and holds the combs firmly within the assembly. Optionally, the bracket 18 may include a hook (not shown) extending under the tie plate 2 and holding the comb against vertical movement along the fuel rods due to water pressure. Since the strips 12 engage the fuel rods with a spring action, this feature is not essential. As is apparent from FIG. 1, the grid strips of the combs 6 and 8 extend at right angles to each other in this embodiment. Sometimes fuel assemblies are made hexagonal, in which case they would be at an angle of 60° to each other. Other angles would be possible, but are not ordinarily utilized.

Figure 2:
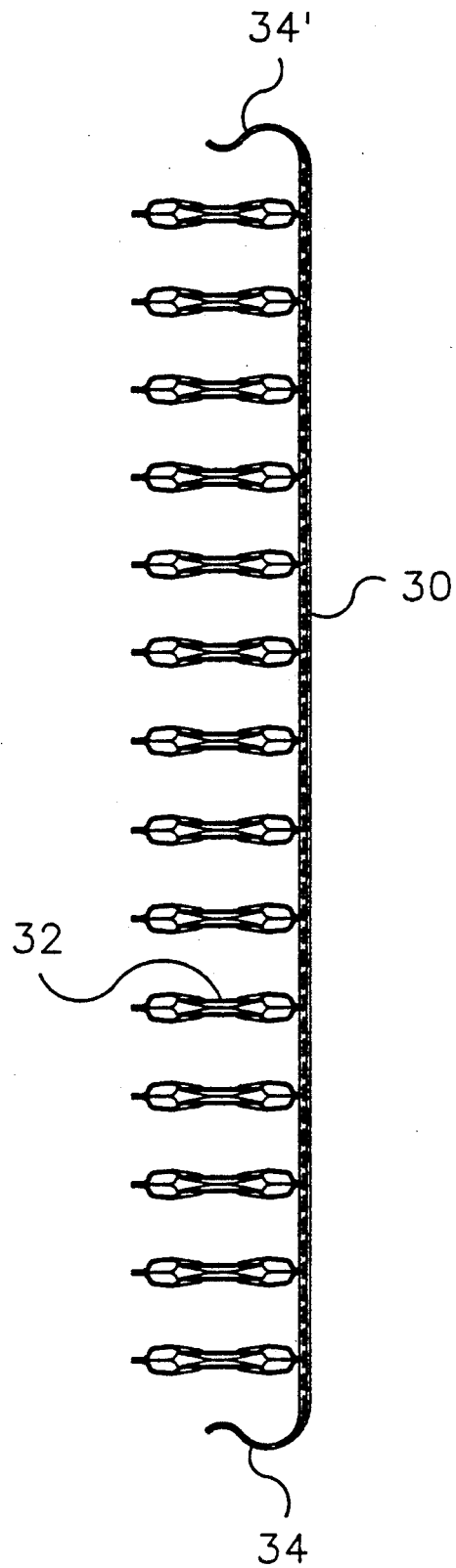
FIG. 2 is a partial plan view of a form of our grid spacer suitable for a pressurized water reactor.
Figure 3:
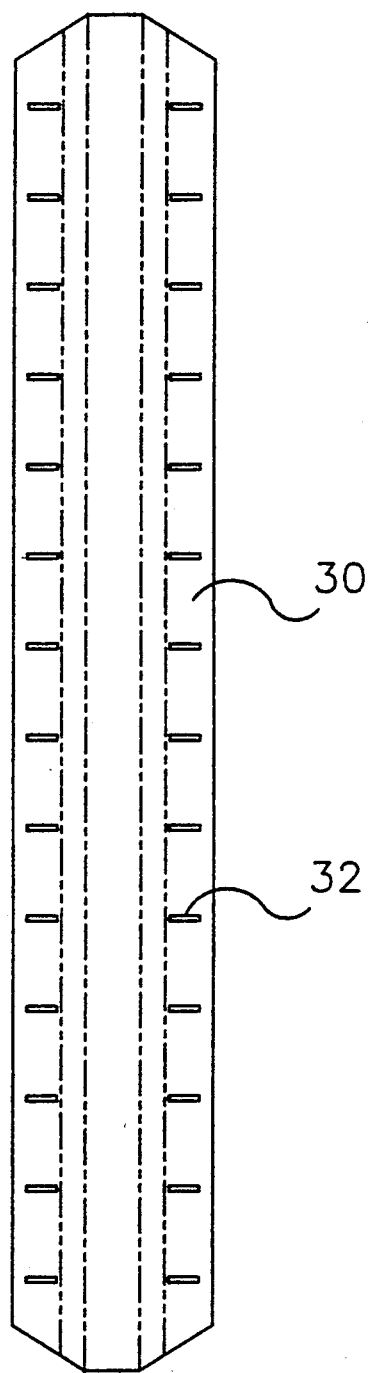
FIG. 3 is an end view of one of the combs of the assembly shown in FIG. 2.

In FIG. 2, we show a partial plan view of a comb adapted for use in a pressurized water reactor. The structure is essentially the same as that shown in FIG. 1 with only such differences as are necessitated by the difference in structure of assemblies for pressurized water reactors as compared to those for reactors of the boiling water type. It includes an end strip 30 and grid strips 32, the latter being shown in their unloaded condition in FIG. 2. Since pressurized water reactor assemblies do not usually include the flow channel characteristic of boiling water reactors, it is necessary to provide different means to hold the combs firmly within the assembly. To this end, we provide spring clips 34, 34' which extend around the terminal fuel rods of the row, and so hold the comb against outward movement. FIG. 3 shows an end view of this comb.

While we have described two embodiments of our invention, it will be understood that various changes are possible. For example, the water channels 14 may be made vertical instead of inclined if the swirling of the water is not necessary. Furthermore, other spring arrangements may be substituted. The essential features are that the grid strips are fastened at one end only to an end strip so as to form combs which can be inserted into the fuel rod without disassembly and that the grid strips extending in different directions are on different combs which are superposed on one another.

We claim as our invention:

1. A spacer for restraining the fuel rods of a nuclear fuel assembly, said assembly being formed of a plurality of parallel, elongated fuel rods so arranged that said assembly is bounded by a polygon having an even number of sides, said rods being so arranged as to lie in a plurality of sets of parallel rows, the rows of each set being perpendicular to one of the sides of said polygon; said spacer comprising:
   a number of spacer combs equal to at least half the number of the sides of said polygon, said spacer combs being superposed on each other, each of said spacer combs comprising:
   a single base strip having a length equal to that of one of the sides of said polygon and a plurality of grid strips equal in number to the spaces between rows in one of said sets, and at least a majority of said grid strips being of a length sufficient to extend substantially the full length of said rows;

said grid strips being provided with spring members positioned to engage each of said rods;

said grid strips being secured to and extending at right angles to said base strip;

the grid strips of different combs being positioned at angles to each other, so as to occupy the spaces between rows in different sets.

2. A spacer as defined in claim 1, wherein said grid strips are provided with water channels, said channels being so positioned as to contact fuel rods, and said grid strips and channels being so constructed and arranged that said channels exert a spring force on said fuel rods.

3. A spacer as defined in claim 1, wherein said base strips include means to restrain said combs against withdrawal from said assembly.

4. A spacer as defined in claim 3, wherein said grid spacer is designed for use on a boiling water reactor fuel assembly, and said means for restraining withdrawal comprises a protuberance extending outwardly from the plane of said base strip.

5. A spacer as defined in claim 3, wherein said means for restraining withdrawal comprises spring means on the ends of said base strip so formed as to extend part way around a fuel rod.

6. A spacer comb for use in forming a spacer in a nuclear fuel assembly comprising: a base strip having a length and a width, said width being much smaller than said length, and a plurality of grid strips having length and widths, said widths being much smaller than said lengths, each of said grid strips being attached at one end to said base strip with the widths of said grid strips being parallel to the width of said base strip and the lengths of said grid strips being at right angles to the length of said base strip, said grid strips being spaced from each other by equal distances and carrying spring means positioned to engage fuel rods of said assembly.

7. A fuel assembly for nuclear reactors comprising:
a top end plate and a bottom end plate;
a plurality of long, slender fuel rods parallel to each other and extending between said end plates;
a plurality of grid spacers positioned between said plates and extending substantially perpendicular to said fuel rods, said grid spacers being so formed as to have cells through which said rods pass;

said rods being so arranged that said assembly is bounded by a polygon having an even number of sides, said rods being so arranged as to lie in a plurality of sets of rows, the rows of each set being perpendicular to a different one of the sides of said polygon;

at least one of said grid spacers comprising a number of spacer combs equal to at least half the number of the sides of said polygon, said spacer combs being superposed on one another, each of the spacer combs comprising;

a single base strip having a length substantially equal to that of one of the sides of said polygon and a plurality of grid strips equal in number to the spaces between rows in one of said sets, and at least a majority of said grid strips being of a length sufficient to extend substantially the full length of said rows;

said grid strips being provided with spring members positioned to engage each of said rows;

said grid strips being provided with spring members positioned to engage each of said rods;

said grid strips being secured to and extending at right angles to said base strip;

the grid strips of different combs being positioned at angles to each other, so as to occupy the spaces between rows in different sets.

8. A fuel assembly as defined in claim 7, wherein said grid strips are provided with water channels, said channels being so positioned as to contact fuel rods, and said grid strips and channels being so constructed and arranged that said channels exert a spring force on said fuel rods.

9. A fuel assembly as defined in claim 7, wherein said base strips include means to restrain said combs from withdrawal from said assembly.

10. A fuel assembly as defined in claim 9, wherein said assembly is designed for use in a boiling water reactor and includes an external channel surrounding said fuel rods, and said means for restraining withdrawal comprises a protuberance on said base strip contacting said external channel.

11. A fuel assembly as defined in claim 9, wherein said means for restraining withdrawal comprises spring means on the ends of said base strip, so formed as to extend part way around and grip a fuel rod.

* * * * *